United States Patent Office 2,982,620
Patented May 2, 1961

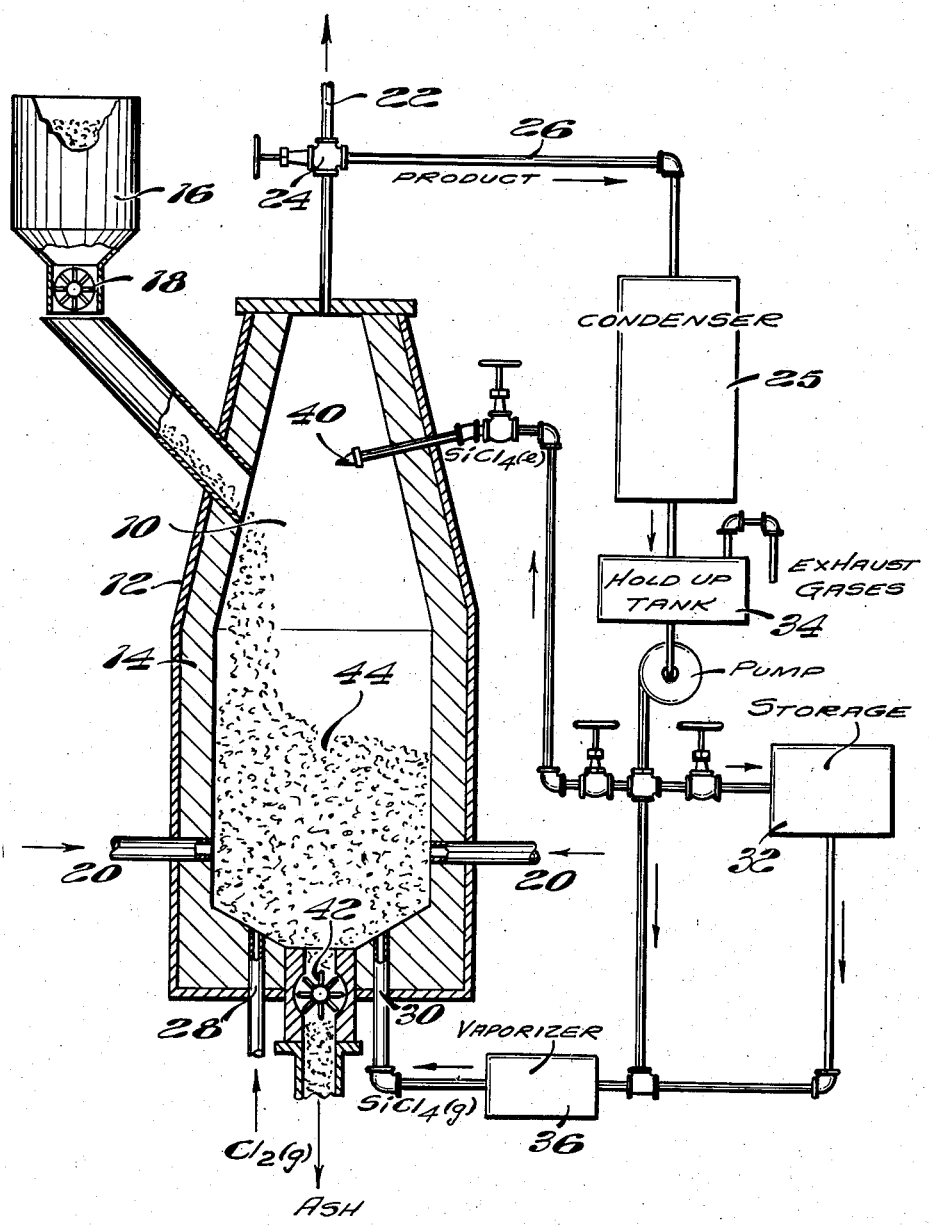

2,982,620

PROCESS FOR PRODUCING SILICON TETRACHLORIDE

Robert D. Beattie, Cambridge, and Johnson E. Vivian, Waltham, Mass., assignors to Cabot Corporation, Boston, Mass., a corporation of Delaware Filed Sept. 7, 1956, Ser. No. 608,606

7 Claims. (Cl. 23—205)

This invention relates to an improved process for the production of silicon tetrachloride by means of the reaction between gaseous chlorine and solid silicon carbide.

In the conventional process for manufacturing silicon tetrachloride, chlorine gas is passed through a bed of hot silicon carbide granules resulting in the following reaction:

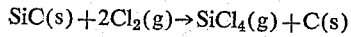

$$SiC(s) + 2Cl_2(g) \rightarrow SiCl_4(g) + C(s)$$

Although the above reaction proceeds readily only at elevated temperatures, i.e. about 1600° F. and above, it is so highly exothermic that, once it has been initiated, it tends to be not only self-sustaining but also self-accelerating, very high temperatures being reached before the rate of heat transfer balances the heat generated. Thus, the heat released by the above chemical reaction amounts to approximately 207,000 B.t.u. per mol, or about 5,175 B.t.u. per pound, of silicon carbide reacted.

The problems connected with trying to control a high temperature reaction involving such intense heat evolution or trying to remove such large amounts of heat from a bed of solid material at such elevated temperatures caused serious processing difficulties resulting in extremely high processing costs for silicon tetrachloride as currently manufactured. Thus, the present day producer must be satisfied with very low production rates in very small sized reaction zones in order to limit the heat released to an amount which can be handled, or else he must accept the consequences of short reactor life, lost running time and other operating troubles which invariably result whenever the sustained chlorine mass flow rate is raised above about 10 lbs./hr./sq. ft.

Even with such reduced operating rates and restricted reaction zone sizes, it has been necessary to use external water cooling in order to effect sufficient heat removal from the bed. In order to protect the highly heat conductive shell, necessary for said heat transfer, from excessive temperatures, operations have always been restricted to the use of a fixed bed the outermost portion of which, at least, is maintained at too low a temperature to be reactive, i.e. not above about 1600° F. In such a set-up there is a continuous temperature gradient from a maximum at the center of the bed to a minimum at the outside next to the reaction zone shell. It is obvious that excellent conversions of the silicon carbide charge are impossible with such an arrangement, because the smaller the reaction zone (or bed diameter) the larger the proportion of the solid charge represented by the cold unreactive peripheral layer, while the larger the reaction zone the higher will be the maximum temperature near the center of the zone and the greater the amount of silicon carbide which becomes inaccessible to reaction through sintering and clinker formation. Sintering and clinkering tendencies also result in bed hang ups and other troubles which shorten the running time between shut downs (for clean outs, etc.) and thereby increase total down time.

The primary object of this invention is to provide an improved method of reacting silicon carbide with chlorine in which the reaction can be controlled and reaction temperatures limited without the necessity of reducing silicon tetrachloride production rates. It is a further object to accomplish this primary object in a simple, efficient manner which will at the same time contribute to the solution of the other processing problems in the manufacture of silicon tetrachloride and greatly reduce the processing costs involved.

Another object of this invention is to provide such a process in which large amounts of heat need not be transferred through the reactor shell, thus making possible the use of apparatus having side walls constructed of insulating refractory brick, thereby eliminating the peripheral blanket of unreacted material and gaining much longer reactor life. Still another object is to provide such a process which may be operated continuously.

Other objects of our invention are to provide a means of controlling the reaction between silicon carbide and chlorine whereby to equalize temperatures in various parts of the reaction zone, even with fixed bed operation, to avoid excessively hot spots or unreactive cold spots regardless of reactor size, and to increase the efficiency of conversion of the reactants. By avoiding sintering and clinkering of solids within the reaction zone it is a further object to permit solid residue to be drawn off from the bottom of the bed and fresh firesand to be added at the top without cessation of the reaction.

Still other objects and advantages of our invention will be made evident from the detailed description and discussion of same which follows.

In accordance with our invention, the reaction between chlorine and silicon carbide is kept under control and the maximum temperatures within the bed of reacting silicon carbide are limited by feeding to the bed, after the reaction has been initiated, certain liquid and/or vaporous chlorides in sufficient amounts to pick up a considerable proportion of the surplus heat, i.e. the heat not needed to preheat the reactants, make up for normal heat losses and maintain the desired reaction temperatures. The particular chlorides suitable for this use are those of antimony and those of elements of group IV of the periodic table having atomic numbers from 14 through 50 with the exception of zirconium, or, in other words, those of silicon, titanium, germanium and tin. All of these chlorides are characterized by having high specific heat capacities, relatively low melting points, and the property of melting instead of subliming when the solid form is slowly heated at normal atmospheric pressures. The amount in which such chloride stream is introduced to the reaction zone in any given case will depend upon the nature of the operation and the reaction conditions desired and will be determined largely by its specific heat capacity, the temperature at which it is fed to the reactor and the maximum temperatures which are desired in various parts of the reactor. In general, for a significant improvement in the efficiency and ease of operation and a significant reduction in the maximum temperature levels of the reaction bed, said chlorides should be supplied at the rate of not less than about 0.25 mol per mol of chlorine fed.

Considered in connection with the accompanying drawing, which is a flow diagram of the process and includes a vertical elevation of a suitable reactor, partly in section, a preferred example of a process for manufacturing silicon tetrachloride using the technique of this invention may be described as follows:

The reactor 10 is of more or less conventional design having a metal shell 12 but being lined on the inside with one or more layers of high temperature refractory material 14. The innermost layer of refractory, at least, should be resistant to chlorine and silicon tetrachloride etc. at reaction temperatures of 1700° F. or above, being composed, for example, in this case of carbon brick backed by a layer of coarse packed silica. Depending partly upon the porosity of the refractory lining, it may be unnecessary to have the customary inside lining of nickel on the metal shell 12. In the present process, water cooling of the shell exterior is generally not necessary.

A charging hopper 16 and associated seal valve 18 are provided for feeding granular firesand or other grades of silicon carbide to the reactor. Heating means 20 are provided in order to preheat the initial solids charge to reaction temperatures. During the preheating stage heating gases or combustion products may be discharged through stack 22 by appropriate setting of the gate 24. After the bed reaches reaction temperature gate 24 is set to deliver product gases to flue 26 leading to the recovery system and flow of free-chlorine containing reaction gases is initiated. The chlorine feed gas is introduced at the bottom of the bed through one or more entry ports 28 or through a manifold distributor arranged to give equal flow across the entire bed. Once the silicon carbide plus chlorine reaction is underway, introduction of the diluent chloride is initiated. In the present example, the diluent chloride introduced is silicon tetrachloride which, as will be seen later, is the preferred species of diluent chloride in the present invention. The silicon tetrachloride introduced as a vapor is delivered to the bottom of the bed through a distributor system 30 similar to that used for the chlorine feed. In the present case, silicon tetrachloride vapors may be supplied by passing liquid product obtained either from liquid storage 32 or from liquid hold up tank 34 in the recovery system through vaporizer 36. Alternatively it may be supplied directly as partially cooled vapor by withdrawing a portion of the product stream in flue 26 before it has been condensed in condenser 25 and feeding it through conduit 30.

Silicon tetrachloride introduced directly as a liquid is preferably introduced as a spray e.g. through nozzle 40 onto the top of the bed. This spray can be concentrated as needed either on the central portion of the bed or over the entire cross-section.

Although the use of as little as 0.25 mol of $SiCl_4$ per mol of $Cl_2$ introduced will greatly assist in evening out bed temperatures and avoiding reactor burn outs, and will increase the efficiency of conversion of silicon carbide and the running time between reactor clean outs even in a reactor of conventional design, the benefits of this invention are best obtained by introducing much larger amounts of silicon tetrachloride so that external water cooling can be omitted in favor of an insulated refractory lined wall as shown in the attached sketch. This makes it possible to use the full cross section of the reactor as reaction space and to minimize temperature differences between various parts of the solids bed.

Having eliminated high flux heat transfer across the reaction bed and through the reactor side walls, it becomes entirely feasible, even with large scale commercially sized units, to limit reaction temperatures to a maximum of about 3000° F. or less, the lowest possible operating temperature for good reaction (i.e. above about 1800° F.) being desirable in order to insure maximum equipment life. The exact amount of silicon tetrachloride which must be returned to the reaction bed in order to maintain such temperature levels will depend upon various factors such as the temperature at which it is introduced, the size and shape of the reactor, the temperature at which the solid feed enters and the concentration of SiC therein, etc. Usually firesand containing about 80 to 90% SiC is used but available grades of usable silicon carbide raw material can contain as little as 50% or as much as 99% by weight. However, in general, to maintain temperatures in the reaction zone in the practicable range from about 1800° to about 3500° F., the total rate of silicon tetrachloride recycle to the reaction zone should be about 1 to 4 mols per mol of chlorine fed. Optimum conditions are generally found using reactor feed rates of 1 to 3 mols of silicon tetrachloride per mol of chlorine and maintaining reaction temperatures in the range of about 2100° to about 2800° F.

By maintaining such relatively uniform reaction conditions, sintering and clinkering within the solids bed can be avoided. It then becomes feasible to discharge ash and other solid residues from the bottom of the bed without cooling down the reactor. The large rotary seal valve 42, shown in the drawing, is provided for this purpose but a screw conveyor or other equivalent means can be used equally well for solids discharge.

Successful solids discharge permits a sort of moving bed operation and frees the silicon carbide plus chlorine reaction from the fixed bed type of operation to which it was tied by the conventional process. In fact, at the higher ratios of silicon tetrachloride to chlorine feed it is even possible to use a fluidized bed technique. This technique gives even more uniform temperature conditions throughout the reactor but is generally not as desirable as the intermittently or continuously moving bed arrangement depicted in the drawing, which provides maximum reactor life and maximum running times between clean outs.

In discussing the operation of the present invention in conjunction with the attached diagram, the diluent chloride has been referred to in all cases as being silicon tetrachloride. Although silicon tetrachloride is the preferred specie of diluent chloride because its use in this connection does not introduce any added separation problems to a process for manufacturing silicon tetrachloride, the limitation of the above discussion strictly to silicon tetrachloride diluent was chiefly for purposes of simplification. It should be understood, therefore, that wherever silicon tetrachloride is mentioned as the diluent there could be substituted, for some or all of same, chlorides of antimony, germanium, tin or titanium or mixtures of same without causing the loss of any of the other important advantages and objects of the present invention. For example, some specific chlorides which are suitable for this purpose are given in the following table:

TABLE I

| Chloride | Melting Point, °C. | Boiling Point at 1 atm. °C. |
|---|---|---|
| $SbCl_3$ | 73.4 | 223.0 |
| $SbCl_5$ | 2.8 | 140.0 |
| $GeCl_4$ | −49.5 | 83.0 |
| $SnCl_2$ | 246.0 | 623.0 |
| $SnCl_4$ | −33.0 | 114.0 |
| $TiCl_4$ | −30.0 | 136.4 |

Of course, the preferred chlorides are those which, like $SiCl_4$, are liquid at normal ambient temperatures, have normal atmospheric boiling points under 200° C. and form vapors which are relatively stable at high temperatures. The ideal compounds, meeting all of these requirements, are $SiCl_4$, $SbCl_5$, $GeCl_4$, $SnCl_4$ and $TiCl_4$, namely those chlorides in which each of the salt forming elements is in its highest valence state.

Following the process of this invention it has been found possible not only to feed much larger amounts of chlorine per unit area of bed cross section than in the conventional processes but also to employ reaction beds of much larger cross section, thereby greatly increasing silicon tetrachloride production rates in spite of the relatively large volumes of diluent chloride vapors also introduced to the reaction bed. Moreover, most unexpectedly, it has been found to be unnecessary to increase the depth of the reaction bed used in order to enjoy these remarkable advantages of the present invention. Apparently the presence of relatively large amounts of diluent chloride does not substantially detract from the completeness of reaction of the chlorine and silicon carbide under given conditions although, according to the law of mass action, the introduction of large quantities of such chloride is unfavorable, especially large quantities of silicon tetrachloride as will be evident from considering the chemical equation for the reaction as written above. In actual fact, reactivity requirements are seldom a factor in determining minimum bed depths, but, because of flow considerations and space considerations, the preferred bed depth will generally run from one to several times the bed diameter.

The following specific operating example is given in order to afford a clearer understanding of the actual steps involved in carrying out the present invention and in order to demonstrate the actual improvements obtained by such operation. It should be understood, however, that this example merely represents one set of usable conditions rather than the extreme or limiting conditions on the scope of our invention.

*Example 1*

Onto a bottom layer of coke in a vertical reactor (such as that shown in the attached drawing) having an inside diameter of about 5 feet, there is charged about 2000 lbs. of firesand containing about 90% by weight silicon carbide most of which has been ground to 10–20 mesh size (Tyler) resulting in an apparent bulk density of about 70 lbs./cu. ft. After the middle portion of the reactor bed 44 has been preheated to a temperature of 1700–1800° F., flow of chlorine gas is initiated to the bottom of the bed from a series of orifices located in a ring about 3 feet in diameter and concentric with the cross section of the reactor. Gate 24 is turned to close the stack 22 and to deliver gaseous reaction products to the silicon tetrachloride recovery system. The chlorine flow rate is then gradually increased until the temperature at the center of the bed rises to about 2100–2300° F. Then, silicon tetrachloride vapors at a temperature of about 150° F. are also admitted to the bottom of the bed, either together with the chlorine or through a separate but adjacent set of orifices, in an amount equivalent to 1.5 mols per mol of chlorine. The flow of both chlorine and silicon tetrachloride is then brought up to the full rate of about 400 lbs./hr. of chlorine and 1200 lbs./hr. of silicon tetrachloride. This represents a chlorine mass flow rate of over 20 lbs./hr./sq. ft. compared with a usual maximum of about 10 lbs./hr./sq. ft. in conventional operation.

Moreover, in the present process the bed of solid firesand does not sinter and cake up so that carbonaceous ash can be removed from time to time and fresh firesand can be added to the top of the bed at an average rate of about 175–200 lbs. per hour. In this way the reactor is kept in sustained production in contrast to the conventional fixed bed technique of operation in which production must be interrupted for several hours at least once per day and usually every several hours while the reactor is cleaned out and recharged. Furthermore, the above improvements are obtained without loss in the efficiency of conversion of the chlorine reactant and with an actual increase in the efficiency of conversion of the silicon carbide reactant.

Since the only additional costs involved in the present process are due to a larger recovery and handling system for silicon tetrachloride, the economic advantages are readily apparent.

Instead of the particular grade of firesand used in the above example, any grade of material containing at least about 75% by weight silicon carbide can be used. Those grades in which the silicon carbide content is mostly in the $\beta$ crystalline phase are preferred since such materials are generally more reactive. However, by using slightly higher levels of the reaction temperatures, materials composed largely of any of the various $\alpha$ crystalline modifications can be used equally well.

Although coarse ground firesands composed largely of granules larger than about 20 mesh (Tyler) are preferred for fixed or moving bed operation such as described above, material composed predominantly of granules smaller than about 30 mesh (Tyler) are preferred for fluid bed operation.

Chlorine mass flow rates even higher than the 20 lbs./hr./sq. ft. described above are entirely feasible when operating in accordance with the present invention, particularly at lower ratios of diluent chloride to chlorine and/or when using fluid bed type operation. The preferred range of chlorine feed rates is usually between about 15 and about 60 lbs./hr./sq. ft. although in some instances rates as low as 10 or as high as 80 lbs./hr./sq. ft. may be desirable.

Instead of feeding all of the silicon tetrachloride as vapor to the bottom of the reactor as in the above example, a portion of same or an additional amount can be sprayed in as liquid to inner portion of the bed of silicon carbide. This procedure can carry the special advantage of affording special cooling to the hottest portion of the bed and thus giving added insurance against sintering and caking.

Completely inert permanent gases such as nitrogen, argon, CO, etc. may also be fed through the reactor bed together with the chlorine and silicon tetrachloride, provided the average concentration of chlorine in the total amount of inlet gases is not reduced below about 20 mol percent. However, preferably, essentially all of the inlet gases will be made up of chlorine and diluent chlorides since such an arrangement simplifies operation of the entire recoverey system, particularly the condenser, (especially when the diluent chloride is silicon tetrachloride) and also because direct recycle of a portion of the product stream prior to the condenser can then be used to supply the diluent chloride vapor feed to the bottom of the reactor without a concomitant build up in the content of the insert permanent gases in the reactant gas stream.

Dry gases which are inert to silicon tetrachloride but reactive with carbon, such as $CO_2$ or $O_2$, may also be passed through the bed for the purpose of removing by-product carbon from the silicon carbide reaction. However, since this also creates permanent inert gases in the gaseous reaction products, this procedure is not especially advantageous and is seldom necessary either, since the by-product carbon and other residual solids can be readily discharged from the bottom of the reactor in the present process when sufficient diluent chloride is introduced to obtain the full benefits of the present invention.

Having fully described the present invention and preferred embodiments thereof, what we claim and desire to secure by U.S. Letters Patent is:

1. A process for producing silicon tetrachloride which comprises introducing into a porous bed of granular silicon carbide heated to reaction temperatures of at least about 1800° F., a reactant stream containing as the only ingredient present in significant amounts which is strongly reactive with silicon carbide, chlorine, and, in a ratio of at least 0.25 mol per mol of chlorine introduced, chlorides of elements from the group consisting of antimony, germanium, silicon, titanium and tin, both the reactant stream and substantially all of said chlorides being introduced in the vapor state in substantially uniform distribution across the full cross section of said bed, the temperature of said chlorides, as introduced, being substantially lower than 1800° F., thereby effecting a controlled exothermic reaction between the chlorine and silicon carbide to produce silicon tetrachloride.

2. The process of claim 1 in which the chlorides enter the bed near the bottom thereof.

3. A process for producing silicon tetrachloride comprising introducing into the bottom of a porous bed of solid granules of silicon carbide firesand heated to at least about 1800° F., reaction gases comprising as the sole ingredient strongly reactive with silicon carbide, chlorine, and, in addition, vaporous silicon tetrachloride in a proportion of between about 0.25 and about 4.0 mols of silicon tetrachloride per mol of chlorine, the chlorine introduced amounting to at least 20 mol percent of the total gases fed to said reaction zone, both said reaction gases and said vaporous silicon tetrachloride being introduced in substantially uniform distribution across the full cross section of said bed, thereby effecting a controlled exothermic reaction between the chlorine and silicon carbide to produce silicon tetrachloride, continuously removing gaseous reaction products including silicon tetrachloride from the top of said reaction zone and, after cooling said products, continuously reintroducing a portion of same in the vapor state to the bottom of said bed together with fresh chlorine.

4. The process of claim 3 in which temperatures throughout the reaction zone are maintained at a level less than about 3500° F.

5. The process of claim 4 in which the vaporous silicon tetrachloride is introduced in a proportion of between about 1 and 3 mols per mol of chlorine.

6. The process of claim 5 in which the granules of silicon carbide firesand are predominantly larger than 20 mesh (Tyler screen), remain relatively stationary during reaction, and contain at least about 50% by weight of silicon carbide.

7. The process of claim 5 in which the granules of silicon carbide firesand are predominantly smaller than 30 mesh (Tyler screen), are in substantially fluid motion during reaction, and contain at least about 50% by weight of silicon carbide.

References Cited in the file of this patent

UNITED STATES PATENTS

| | | |
|---|---|---|
| 1,271,713 | Hutchins | July 9, 1918 |
| 1,350,932 | Moore | Aug. 24, 1920 |
| 2,425,504 | Belchetz | Aug. 12, 1947 |
| 2,621,111 | Stedman | Dec. 9, 1952 |
| 2,868,622 | Bennett et al. | Jan. 13, 1959 |